US011209449B2

(12) United States Patent
Tomita

(10) Patent No.: US 11,209,449 B2
(45) Date of Patent: Dec. 28, 2021

(54) AUTOSAMPLER

(71) Applicant: SHIMADZU CORPORATION, Kyoto (JP)

(72) Inventor: Masami Tomita, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 7 days.

(21) Appl. No.: 15/557,345

(22) PCT Filed: Mar. 11, 2015

(86) PCT No.: PCT/JP2015/057100
§ 371 (c)(1),
(2) Date: Sep. 11, 2017

(87) PCT Pub. No.: WO2016/143085
PCT Pub. Date: Sep. 15, 2016

(65) Prior Publication Data
US 2018/0052184 A1    Feb. 22, 2018

(51) Int. Cl.
*G01N 1/42* (2006.01)
*G01N 35/02* (2006.01)
(Continued)

(52) U.S. Cl.
CPC ......... *G01N 35/026* (2013.01); *B01D 15/12* (2013.01); *B01D 15/24* (2013.01); *G01N 1/42* (2013.01); *G01N 30/06* (2013.01); *G01N 30/24* (2013.01); *G01N 30/88* (2013.01); *G01N 35/10* (2013.01); *G01N 35/1083* (2013.01);
(Continued)

(58) Field of Classification Search
CPC .................. G01N 2035/00445; G01N 1/42
See application file for complete search history.

(56) References Cited

U.S. PATENT DOCUMENTS 1,684,502 A * 9/1928 Albin ............... A47K 3/283
4/614
1,766,125 A * 6/1930 Jahns ............... A47K 3/284
52/198
(Continued)

FOREIGN PATENT DOCUMENTS

CN    102597739 A    7/2012
CN    103308377 A    9/2013
(Continued)

OTHER PUBLICATIONS

International Search Report for PCT/JP2015/057100 dated Jun. 2, 2015 [PCT/ISA/210].
(Continued)

*Primary Examiner* — Lisa M Caputo
*Assistant Examiner* — Alex T Devito
(74) *Attorney, Agent, or Firm* — Sughrue Mion, PLLC

(57) ABSTRACT

An autosampler includes: a sample cooling unit that is brought into thermally contact with a bottom surface of a sample rack so as to cool a sample accommodated in the sample rack; a condensed water receiver that has at least one hole on a bottom surface thereof, and is provided below the sample rack for receiving water condensed around the sample rack; a discharging passage configured in such a manner that a droplet falling from the at least one hole flows therein.

2 Claims, 4 Drawing Sheets

(51) Int. Cl.
    *G01N 30/24*     (2006.01)
    *G01N 35/10*     (2006.01)
    *B01D 15/12*     (2006.01)
    *B01D 15/24*     (2006.01)
    *G01N 30/06*     (2006.01)
    *G01N 30/88*     (2006.01)
    *G01N 35/00*     (2006.01)

(52) U.S. Cl.
    CPC . *G01N 35/1095* (2013.01); *G01N 2030/8804* (2013.01); *G01N 2035/00445* (2013.01); *G01N 2035/00455* (2013.01)

(56) References Cited

U.S. PATENT DOCUMENTS

| | | | |
|---|---|---|---|
| 4,037,427 A * | 7/1977 | Kramer | F25D 21/02 |
| | | | 62/128 |
| 5,147,551 A | 9/1992 | Averette | |
| 5,158,184 A * | 10/1992 | Craft | A47L 19/04 |
| | | | 211/41.3 |
| 2012/0219473 A1 | 8/2012 | Ishii et al. | |
| 2013/0240181 A1 | 9/2013 | Yasunaga | |

FOREIGN PATENT DOCUMENTS

| | | |
|---|---|---|
| DE | 11 2010 004 267 T5 | 4/2013 |
| JP | 2011-099705 A | 5/2011 |
| JP | 2011-252718 A | 12/2011 |
| JP | 2013-190245 A | 9/2013 |
| WO | 2011/055694 A1 | 5/2011 |

OTHER PUBLICATIONS

Written Opinion for PCT/JP2015/057100 dated Jun. 2, 2015 [PCT/ISA/237].

Communication dated Mar. 11, 2020 by the Indian Patent Office in application No. 201747034021.

* cited by examiner

AUTOSAMPLER

CROSS REFERENCE TO RELATED APPLICATIONS

This application is a National Stage of International Application No. PCT/JP2015/057100 filed Mar. 11, 2015, the contents of which are incorporated herein by reference in its entirety.

TECHNICAL FIELD

The present invention relates to an autosampler having a cooling unit for cooling sample liquid in a sample container disposed on a sample rack.

BACKGROUND ART

An autosampler is used for continuous analysis on a plurality of samples in an analyzing apparatus, such as a liquid chromatograph. With the autosampler, sample liquid is automatically collected from a plurality of sample bottles (vials) disposed in a sample rack, and is introduced into the analyzing apparatus (see Patent Literature 1, for example).

In autosamplers, a sample cooling unit may be used for cooling sample liquid so as to prevent the sample liquid from volatilization or deterioration. The sample liquid is cooled, for example, by bringing a heat conductive block that has been cooled by a Peltier element into contact with the bottom surface of a sample rack, to cool vials disposed on the sample rack.

When the sample liquid is thus cooled, the temperature inside the autosampler decreases, causing condensation. In particular, the condensation tends to occur on and around the heat conductive block that is cooled to a low temperature. If the condensed water flows down along a wall of the heat conductive block and reaches the surrounding area, a portion of the water may flow into a section where an electric system is accommodated and cause a short circuit, or it may cause rust to occur inside the housing.

CITATION LIST

Patent Literature

Patent Literature 1: JP 2011-252718 A

SUMMARY OF INVENTION

Technical Problem

In order to solve the aforementioned problems, a certain measurement for preventing water condensation from occurring has been taken for an autosampler including a sample cooling unit, such as a dehumidifying mechanism to dehumidify air inside the autosampler. Here, the prevention of water condensation requires dehumidification of the entire amount of air inside the autosampler. For such dehumidification, a high-performance dehumidifying mechanism should be included in the autosampler, which would cause the price of the autosampler to increase.

An object of the present invention is to provide an autosampler that includes a sample cooling unit for cooling sample liquid, and one that is capable of discharging condensed water without using an expensive system, such as a high-performance dehumidifying device.

Solution to Problem

An autosampler according to the present invention developed for solving the above problems includes:

a) a sample cooler that is brought into thermal contact with a bottom surface of a sample rack to cool a sample accommodated in the sample rack;

b) a condensed water receiver provided below the sample rack, for receiving water condensed around the sample rack, with at least one hole formed in the bottom surface of the condensed water receiver; and c) a discharging passage formed in such a manner that a droplet falling from the at least one hole flows into this discharging passage.

The sample cooler may be a plate- or block-shaped aluminum member that is cooled by a Peltier element.

The present invention has been developed in view of the fact that water condensation locally occurs inside the autosampler, and can solve conventional problems by assuredly discharging the water thus condensed. In other words, the present invention can solve the problems caused by the condensed water without using an expensive dehumidifying mechanism that dehumidifies the entire amount of air inside the autosampler, unlike conventional devices.

In the autosampler, since the collection of sample liquid and other related processes are performed, the air inside the autosampler contains large quantities of vapor. Therefore, when the sample liquid is cooled, vapor condensation locally occurs at an area that is cooled to a low temperature inside the housing. In the autosampler according to the present invention, water condensed around the sample rack that is cooled by the sample cooler flows down to the condensed water receiver located below the sample rack, so as to be introduced to the discharging passage through the hole of the condensed water receiver. Accordingly, the condensed water in the autosampler can assuredly be discharged.

It is preferable for the autosampler according to the present invention to further include d) a cover member that is disposed between the sample rack and the sample cooler to cover the sample cooler from above, the cover member being thermally conductive at least in its top surface.

With such a configuration employing the cover member that covers the sample cooler from the above, the sample cooler is not exposed to the inside of the autosampler, and condensation occurs on the cover member that covers the sample cooler. In view of this, the cover member is placed so that water condensed on the cover member flows down to the condensed water receiver along the side surfaces of the cover member, thereby more assuredly discharging the water.

Furthermore, the cover member's shape is appropriately adjusted so as to allow the condensed water that flows down along the side surfaces of the cover member of the cooler to assuredly flow into the discharging passage even when slight displacement occurs in the relative positional relationship among the members concerned. With this, the condensed water is assuredly discharged.

It is preferable for the condensed water receiver to have an inclined portion that slopes down toward the aforementioned at least one hole. With this, the condensed water that flows down to the condensed water receiver can be efficiently introduced to the discharging passage.

Advantageous Effects of the Invention

With an autosampler according to the present invention, condensed water can be assuredly discharged without using an expensive system, such as a high-performance dehumidifying device.

DESCRIPTION OF EMBODIMENTS

An embodiment of an autosampler according to the present invention is described as follows, with reference to the drawings.

Figure 1:
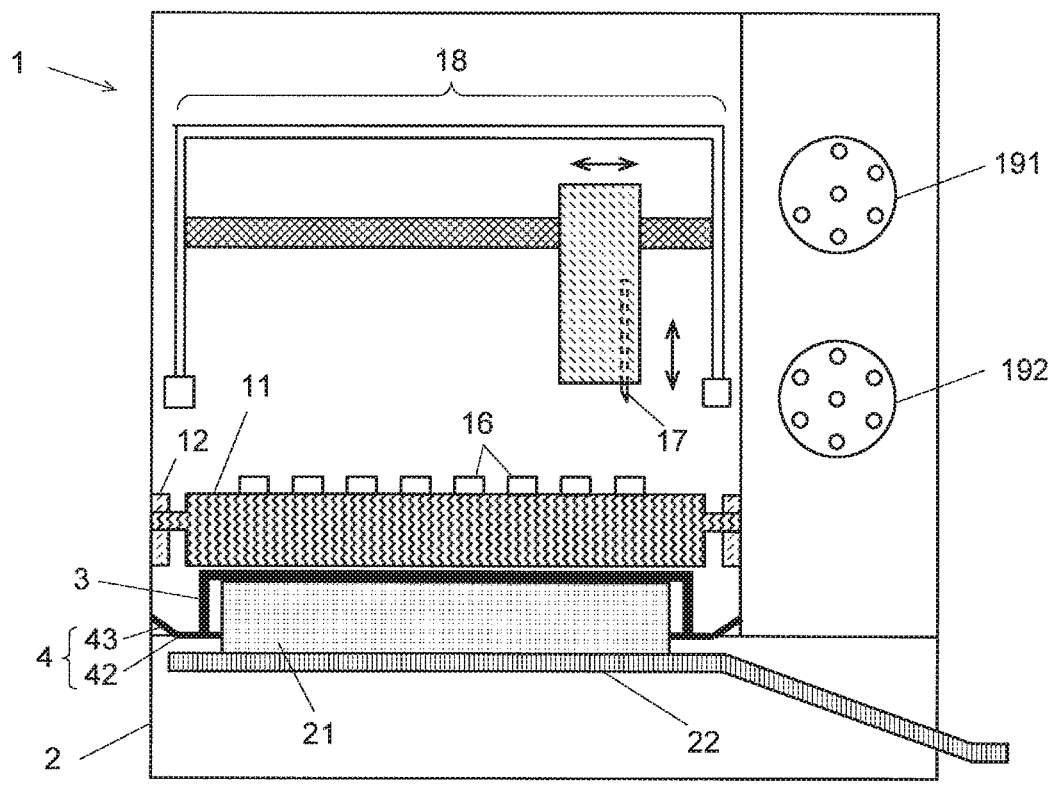
FIG. 1 is a schematic configuration diagram showing an autosampler according to an embodiment of the present invention.

FIG. 1 shows a schematic configuration of the autosampler according to the present embodiment.

An autosampler 1 is provided with a sample-rack mounting section 12 at its side surface for allowing a sample rack 11 to be mounted. The autosampler 1 contains a sampling needle (hereinafter, simply referred to as a "needle") 17 for collecting sample liquid from each of the vials 16 disposed on the sample rack 11, and a moving mechanism 18 for moving the needle 17 in the horizontal and vertical directions. A sample collected by the needle 17 flows into a tubular passage (not shown) made of a flexible resin or other material, to be introduced into an analyzing apparatus, such as a liquid chromatograph. The autosampler 1 also includes passage switching valves 191 and 192 for switching such passages.

The autosampler 1 includes, at its bottom, a condensed water receiver 4 and a cooling-unit cover member 3 (hereinafter, simply referred to as a "cover member") on which the sample rack 11 can be placed.

Figure 2:
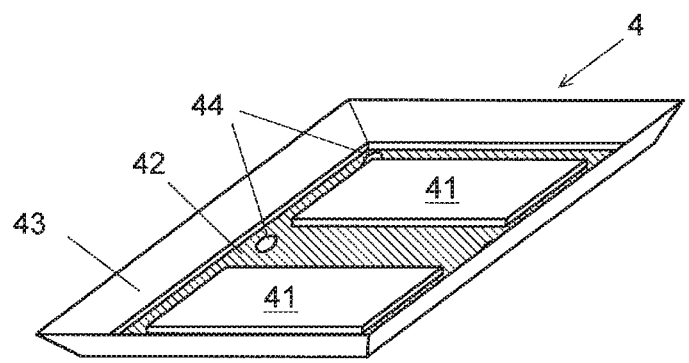
FIG. 2 is an explanatory view showing a configuration of a concave portion according to the present embodiment.
Figure 3:
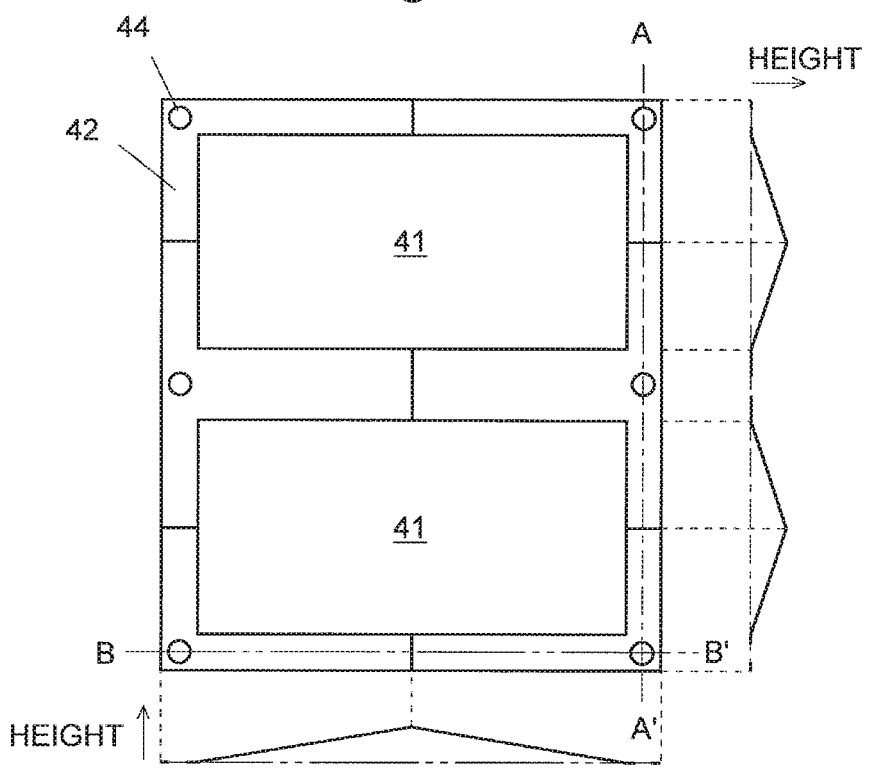
FIG. 3 is an explanatory view showing a shape of the concave portion in a condensed water receiver according to the present embodiment.

FIG. 2 shows a schematic diagram of the condensed water receiver 4. The condensed water receiver 4 includes a concave portion 42 that surrounds two openings 41 individually provided at center portions of the condensed water receiver 4, and an inclined portion 43 that is positioned outside the concave portion 42 and slopes down toward the concave portion 42. The two openings 41 receive a later-described metal block 21, which is made of aluminum, for example. As shown in FIG. 3, the concave portion 42 is provided with one or more holes 44 at the four corners, long sides, or other portions. The respective cross sectional views taken along the line A-A' (right) and the line B-B' (bottom) in FIG. 3 show that the bottom surface of the concave portion 42 slopes down toward the respective holes 44.

The cooling mechanism 2 includes a metal block 21 cooled by a Peltier element which is not shown, and a discharging passage 22.

The metal block 21 is inserted into the openings 41 of the condensed water receiver 4 from below. Then, the aluminum cover member 3 is mounted so as to cover the top and side surfaces of the metal block 21, and is fixed with threads and other means from above. When the cover member 3 is mounted, the bottom end of the circumferential wall of the cover member 3 comes into contact with the top surface of the concave portion 42 of the condensed water receiver 4. With this, the space inside the autosampler 1 is insulated from the outside.

Figure 4:
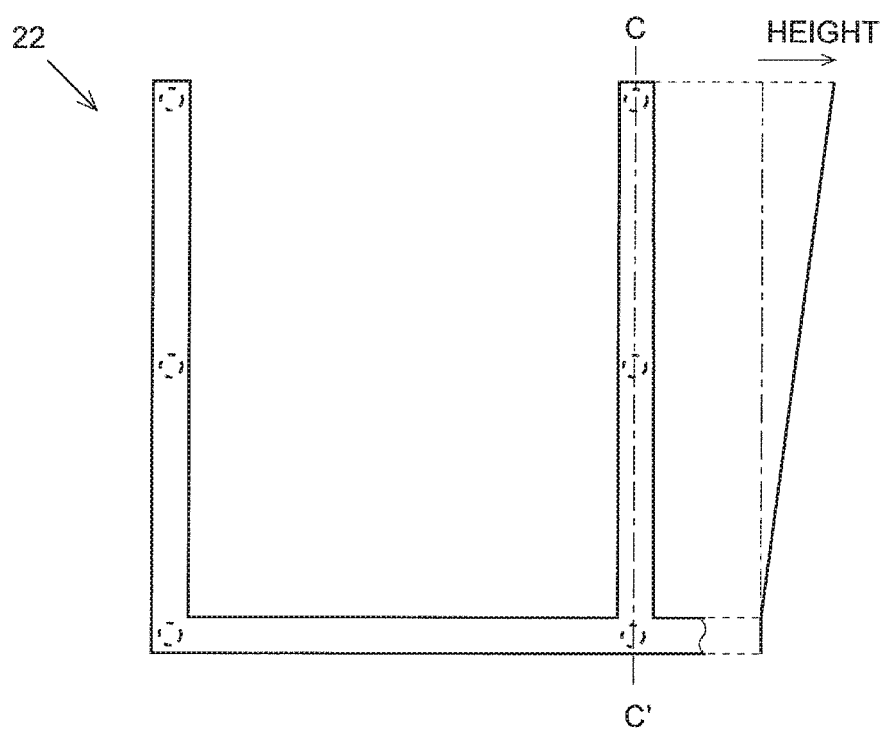
FIG. 4 is an explanatory view showing the shape of a discharging passage according to the present embodiment.

The discharging passage 22 according to the present embodiment is formed, for example, in a substantial U-shape in a planar view, as shown in FIG. 4. Here, the discharging passage 22 does not always need to be formed in the substantial U-shape, as long as the positions indicated by circles with broken lines are individually located immediately below the respective holes 44 of the concave portion 42. The cross sectional view of the discharging passage taken along the line C-C' (right) in FIG. 4 shows that the discharging passage 22 slopes down from the back side toward the front side of the autosampler. At the distal end of the inclined discharging passage 22, another passage is formed for discharging water to the outside of the cooling mechanism 2.

The description is given to a route through which condensed water flows when sample liquid is cooled in the autosampler 1 according to the present embodiment. The metal block 21 is cooled to a low temperature by a Peltier element, thereby cooling the sample rack 11 via the cover member 3. Accordingly, the sample liquid inside each of the vials 16 disposed in the sample rack 11 is cooled. This causes condensation of vapor inside the autosampler 1 in which the collection of sample liquid and other related processes are performed. In particular, the condensation intensively occurs on and around the cover member 3 that is cooled to a low temperature. Water thus generated flows down along the side surfaces of the cover member 3, and then flows into the concave portion 42 of the condensed water receiver 4 which is positioned in contact with the bottom end of the side surfaces of the cover member 3. The water generated due to condensation on an inner wall surface and other portions of the autosampler 1 flows along the inner wall surface and other portions and is introduced into the concave portion 42 along the inclined portion 43 of the condensed water receiver 4, to be eventually discharged, like the above.

As described with reference to FIG. 3, the concave portion 42 has the bottom surface that slopes down toward the respective holes 44. Accordingly, the water that flows into the concave portion 42 reaches the holes 44 and falls down. As described with reference to FIG. 4, the discharging passage 22 is formed immediately below the respective holes 44, so that the condensed water falls down into the discharging passage 22 (at the positions indicated by circles with broken lines in FIG. 4). The condensed water that falls into the discharging passage 22 flows along the inclined surface of the passage in the forward direction so as to be discharged to the outside of the cooling mechanism 2 along the passage.

The aforementioned embodiment is an example of the present invention, and can be appropriately modified along with intentions of the present invention.

The condensed water receiver 4 in the previous embodiment includes the concave portion 42 arranged to surround the entire circumference of each of the openings 41, and the inclined portion 43 formed around the concave portion 42. Alternatively, the condensed water receiver 4 may include an inclined portion sloping down from the outside toward the openings and a vertical wall formed at the lowest end of the inclined portion.

Figure 5:
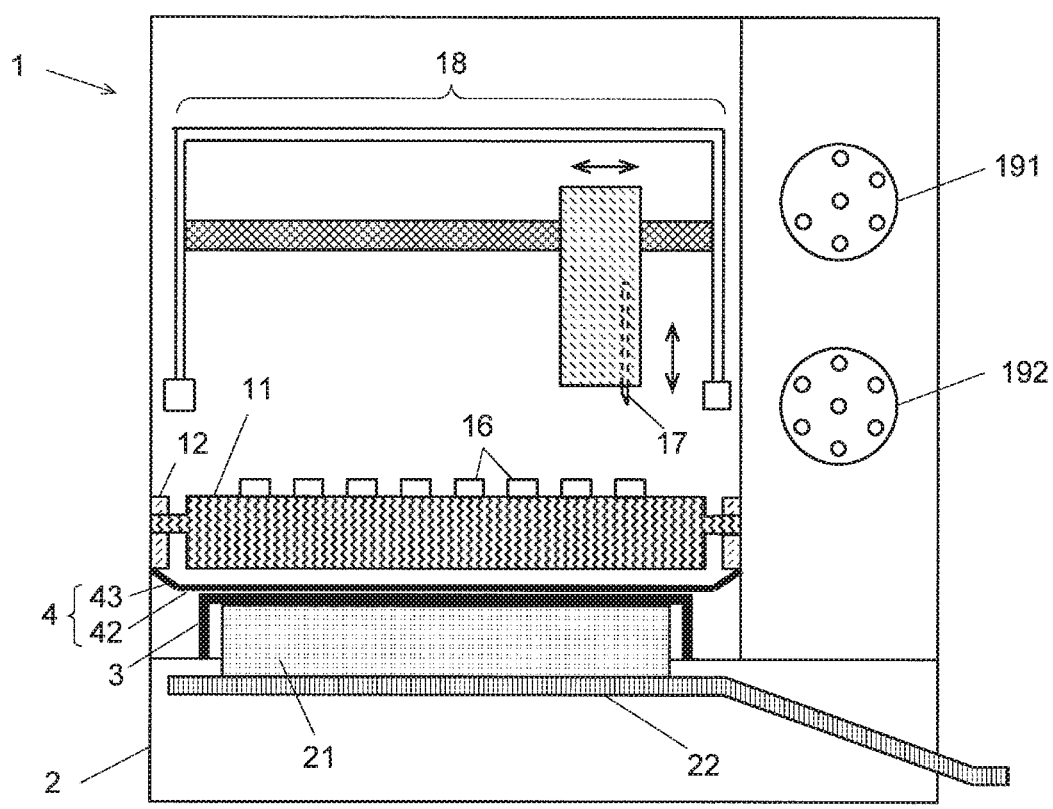
FIG. 5 is a schematic configuration diagram showing an autosampler according to another embodiment of the present invention.

As opposed to the previous embodiment in which the condensed water receiver 4 is arranged below the cover member, the condensed water receiver 4 may be arranged above the cover member 3, as shown in FIG. 5, to obtain the same effects. In addition, the cover member 3 and the condensed water receiver 4 may be integrally constructed. In these cases, no openings 41 are needed. It is only required that the top surface of the metal block 21 is brought into thermal contact with the rear surface of the cover member 3.

The autosampler 1 according to the aforementioned embodiment is a so-called integrated-type autosampler in which the cooling mechanism 2 is disposed inside the autosampler 1. Here, the configuration according to the present invention can also be used as a so-called detachable-type autosampler in which the cooling mechanism is attachable to and detachable from an autosampler main body.

Figure 6:
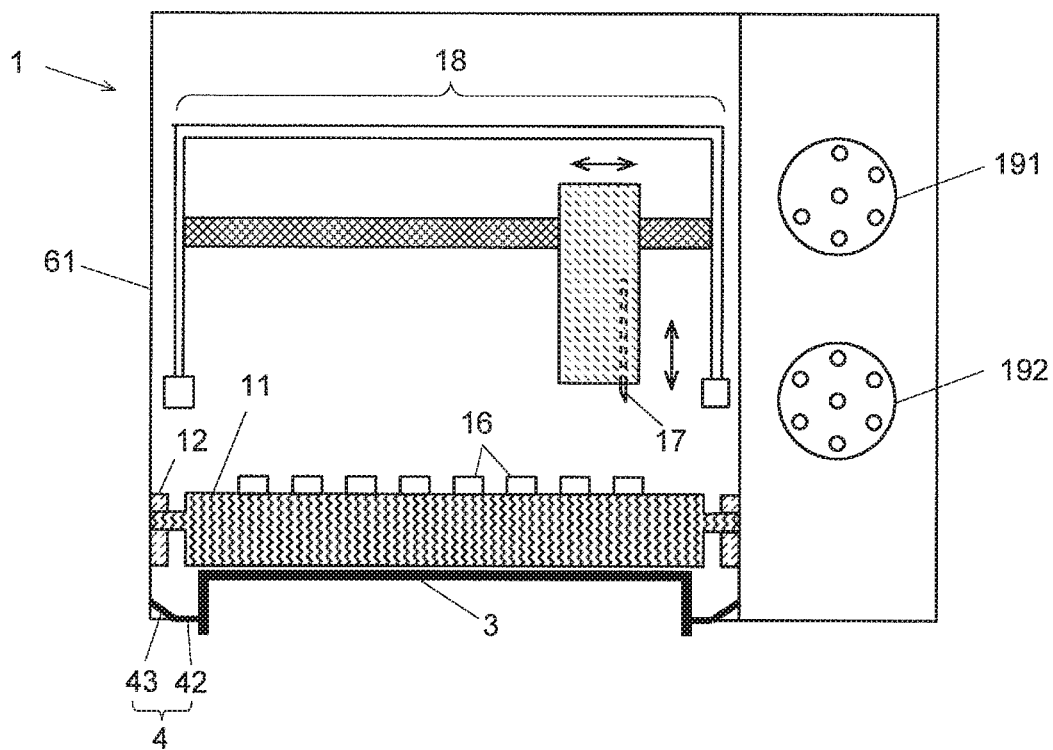
FIG. 6 is a schematic configuration diagram showing a detachable-type autosampler according to still another embodiment of the present invention.
Figure 6:
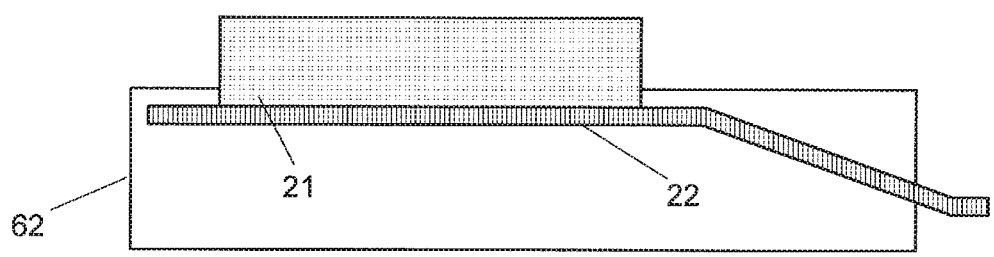

FIG. 6 shows an example of the detachable-type autosampler 1. The autosampler 60 is different from the aforementioned autosampler 1 in that an autosampler main body 61, which includes the sample-rack mounting section 12, condensed water receiver 4 and other components, is attachable to and detachable from a cooling mechanism 62 which includes the metal block 21 and the discharging passage 22. In the autosampler 60, the cooling mechanism 62 can be mounted only when sample liquid that requires to be cooled is analyzed, thereby satisfying the needs of a wider range of users.

Figure 7:
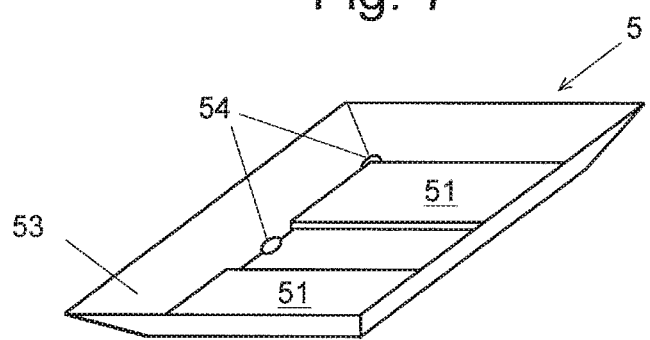
FIG. 7 is an explanatory view showing an example in which a cover member and the condensed water receiver are integrally formed.

Although the cover member 3 and the condensed water receiver 4 are separately configured with different members in the aforementioned embodiment, these can be integrally configured. FIG. 7 shows an example of such an integrated configuration of a cover-integrated member 5. The cover-integrated member 5 is made of aluminum, for example. The cover-integrated member 5 includes: a cover portion 51 having a top surface on which the sample rack 11 is disposed and a circumferential wall along which condensed water falls down; an inclined portion 53 connected to the bottom end of the circumferential wall of the cover portion 51; and a hole 54 provided at least at one position. In the configuration shown in FIG. 7, in place of the inclined portion 53 connected to the bottom end of the circumferential wall of the cover portion 51, the concave portion 42 and the inclined portion 43 mentioned above may be arranged in this order in the bottom end of the circumferential wall to form a structure similar to the aforementioned condensed water receiver 4.

In the aforementioned embodiment, the metal block 21 cooled by a Peltier element is used as the cooling member, and the cover member 3 is made of aluminum. It is also possible to use copper or a similar material that has high thermal conductivity. The cover member 3 only needs to thermally connect the cooling member 21 to the sample rack 11, and therefore, may have its side surfaces made of a resin. Further, the cover member 3 may have any shape that has side surfaces along which the condensed water can fall down. There are various possible shapes, such as a shape with a trapezoid cross section, in addition to a shape with a rectangular cross section as in the previous embodiment. Furthermore, the number of openings 41 (two) can be appropriately changed. Thus, the number of cooling members 21 and that of cover members 3 can be appropriately changed depending on the change in the number of openings 41 (it should be noted that no opening is provided when the cover-integrated member is used).

Although the cover member 3 is used in each of the aforementioned embodiments, an autosampler that does not use the cover member 3 can also be constructed. For example, in the configuration shown in FIG. 1, instead of using the cover member 3, the gap between the metal block 21 and each opening 41 of the condensed water receiver 4 may be sealed by an insulation sealing member or similar element. This prevents the condensed water from flowing into a section where an electric system is accommodated, while allowing the condensed water to be discharged to the discharging passage 22 through the holes 44 of the condensed water receiver 4. Similarly, in the configuration shown in FIG. 5, in which the condensed water receiver 4 is arranged above the top surface of the metal block 21, the gap between the metal block 21 and an opening provided in the bottom surface of an upper housing of the autosampler 1 for receiving the metal block 21 may be sealed by an insulation sealing member or similar element. This prevents the condensed water from flowing into a section where an electric system is accommodated, while allowing the condensed water to be discharged.

Although the previously described embodiment is concerned with an autosampler for use in a liquid chromatograph, the autosampler can be used for various analyzing apparatuses in which sample liquid is analyzed using an autosampler.

REFERENCE SIGNS LIST

1 . . . Autosampler
  11 . . . Sample Rack
  12 . . . Sample-Rack Mounting Section
  16 . . . Vial
  17 . . . Needle
  18 . . . Moving Mechanism
  191, 192 . . . Passage Switching Valves
61 . . . Autosampler Main Body
2 . . . Cooling Mechanism
  21 . . . Metal Block (Cooling Member)
  22 . . . Discharging Passage
3 . . . Cooling-Unit Cover Member
4 . . . Condensed Water Receiver
  41 . . . Opening
  42 . . . Concave Portion
  43 . . . Inclined Portion
  44 . . . Hole
5 . . . Cover-Integrated Member
  51 . . . Cover Portion
  53 . . . Inclined Portion
  54 . . . Hole

The invention claimed is:
1. An autosampler comprising:
a) a sample cooler that is brought into thermal contact with a bottom surface of a sample rack to cool a sample accommodated in a vial, wherein the sample rack supports a bottom surface of the vial;
b) a condensed water receiver provided below the sample rack, for receiving water condensed around the sample rack, with at least one hole passing through a quadrangular bottom surface of the condensed water receiver;
c) a discharging passage formed in such a manner that a droplet falling from the at least one hole flows into this discharging passage;

d) a cover member that is provided separately from the sample rack and the condensed water receiver and is disposed between the sample rack and the sample cooler to cover the sample cooler from above, and is disposed between the condensed water receiver and the sample rack, the cover member being thermally conductive at least in its top surface;

wherein the condensed water receiver is placed below a lowermost surface of the cover member and receives water condensed on the cover member.

2. The autosampler according to claim 1, wherein:

the condensed water receiver includes an opening and a concave portion which is the quadrangular bottom facing surface;

a metal block included in the sample cooler is inserted into the opening; and the concave portion is formed in such a manner as to slope down toward the hole.

\* \* \* \* \*